(12) United States Patent
Kemmer et al.

(10) Patent No.: US 12,247,301 B2
(45) Date of Patent: Mar. 11, 2025

(54) CATALYST FOR OXYGEN GENERATION REACTION DURING WATER ELECTROLYSIS

(71) Applicant: Heraeus Deutschland GmbH & Co. KG, Hanau (DE)

(72) Inventors: Martina Kemmer, Hanau (DE); Christian Gebauer, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 386 days.

(21) Appl. No.: 17/625,621

(22) PCT Filed: Jun. 8, 2020

(86) PCT No.: PCT/EP2020/065864
§ 371 (c)(1),
(2) Date: Jan. 7, 2022

(87) PCT Pub. No.: WO2021/004716
PCT Pub. Date: Jan. 14, 2021

(65) Prior Publication Data
US 2022/0259750 A1 Aug. 18, 2022

(30) Foreign Application Priority Data
Jul. 10, 2019 (EP) .................... 19185574

(51) Int. Cl.
| C25B 11/054 | (2021.01) |
| C25B 1/04 | (2021.01) |
| C25B 9/19 | (2021.01) |
| C25B 11/065 | (2021.01) |
| C25B 11/067 | (2021.01) |
| C25B 11/075 | (2021.01) |
| H01M 4/90 | (2006.01) |
| H01M 4/92 | (2006.01) |
| H01M 8/10 | (2016.01) |

(52) U.S. Cl.
CPC .............. *C25B 11/054* (2021.01); *C25B 1/04* (2013.01); *C25B 9/19* (2021.01); *C25B 11/065* (2021.01); *C25B 11/067* (2021.01); *C25B 11/075* (2021.01); *H01M 4/9016* (2013.01); *H01M 4/923* (2013.01); *H01M 4/925* (2013.01); *H01M 4/926* (2013.01); *H01M 2008/1095* (2013.01)

(58) Field of Classification Search
None
See application file for complete search history.

(56) References Cited

U.S. PATENT DOCUMENTS

| 7,569,509 B2 | 8/2009 | Donuma |
| 9,425,465 B2 | 8/2016 | Noritak |
| 9,548,498 B2 | 1/2017 | Klose-Schubert et al. |
| 2007/0292744 A1 | 12/2007 | Lopez et al. |
| 2011/0081599 A1 | 4/2011 | Lee |
| 2011/0223523 A1 | 9/2011 | Lopez et al. |
| 2014/0322631 A1 | 10/2014 | Klose-Schubert et al. |
| 2017/0141405 A1 | 5/2017 | Neumann et al. |
| 2019/0379058 A1* | 12/2019 | Haas .................. B01J 23/6445 |

FOREIGN PATENT DOCUMENTS

| EP | 2575202 | | 4/2013 |
| EP | 2954951 A1 | | 12/2015 |
| EP | 3214206 A | * | 9/2017 |
| JP | 2008251413 A | | 10/2008 |
| JP | 2017179408 A | | 10/2017 |
| KR | 101769756 B1 | | 8/2017 |
| WO | 2005049199 A1 | | 6/2005 |
| WO | 2018077857 A1 | | 5/2018 |
| WO | WO2018234194 A1 | | 12/2018 |

OTHER PUBLICATIONS

Karimi, Fatemeh et al., "Effect of Calcination Temperature on the Morphological and Electrochemical Characteristics of Supported Iridium Hydroxyoxide Electrocatalysts for the PEM Electrolyzer Anode", Journal of The Electrochemical Society, 164 (4) F464-F474, 2017.
Li, Junnan et al., "Enhanced photocatalytic oxygen evolution activity by formation of Ir@IrOx(OH)y core shell heterostructure", Nanotechnology 29, 405705 (10pp), 2018.
Massue, Cyriac et al., "High-Performance Supported Iridium Oxohydroxide Water Oxidation Electrocatalysts", ChemSusChem, 10, 1943-1957, 2017.
Massue, Cyriac, "Iridium oxohydroxide electrocatalysts for the oxygen evolution reaction", Doctoral Thesis, Technischen Universität Berlin, https://pure.mpg.de/rest/items/item_2286707/component/file_2305742/content > (accessed Feb. 23, 2023), May 9, 2016.
"Response to Opposition in European Patent No. 3764443B1 on Feb. 5, 2024".
Pfeifer, Verena , et al., "Supplementary Information to The Electronic Structure of Iridium Oxide Electrodes Active in Water Splitting", Electronic Supplementary Material (ESI) for Phys. Chem. Chem. Phys., 2016, 18:2292-2296, 14 pages.
Pfeifer, V , et al., "The Electronic Structure of Iridium Oxide Electrodes Active in Water Splitting", Phys. Chem. Chem. Phys., 2016, 18:2292-2296.
Abbott, et al., Iridium Oxide for the Oxygen Evolution Reaction: Correlation between Particle Size, Morphology, and the Surface Hydroxo Layer from Operando XAS, Chem. Mater. 2016, 28, 6591-6604.

(Continued)

*Primary Examiner* — Yun Qian
(74) *Attorney, Agent, or Firm* — Blank Rome LLP

(57) ABSTRACT

The invention relates to a method for preparing a catalyst composition, wherein in an aqueous medium containing an iridium compound, at a pH 9, an iridium-containing solid is deposited on a support material, and the support material loaded with the iridium-containing solid is separated from the aqueous medium and dried, wherein, in the method, the support material loaded with the iridium-containing solid is not subjected to a thermal treatment at a temperature of more than 250° C. for a period of time of longer than 1 hour.

13 Claims, No Drawings

(56) References Cited

OTHER PUBLICATIONS

Carmo, et al., A Comprehensive Review on PEM Water Electrolysis, International Journal of Hydrogen Energy, 2013, 38:4901-4934.

Kumar, et al., Hydrogen production by PEM water electrolysis—A review, Materials Science for Energy Technologies 2, 2019, 442-454.

Reier, et al., Electrocatalytic Oxygen Evolution Reaction in Acidic Environments—Reaction Mechanisms and Catalysts, Adv. Energy Mater. 2017, 7:1601275, 18 pages.

Sapountzi, et al., Electrocatalysts for the generation of hydrogen, oxygen and synthesis gas, Progress in Energy and Combustion Science, 2107, 58:1-35.

International Search Report issued in PCT/EP2020/065864 on Jul. 21, 2020.

Da Silva, G.C. et al. "Effect of Temperature on the Activities and Stabilities of Hydrothermally Prepared IrOx Nanocatalyst Layers for the Oxygen Evolution Reaction", Applied Catalysis B: Environmental, 2017, 218:287-297.

Karimi, F. et al., "Comparison of Conventional Versus Microwave Heating for Polyol Synthesis of Supported Iridium based Electrocatalyst for Polymer Electrolyte Membrane Water Electrolysis", International Journal of Hydrogen Energy, 2017, 42:5083-5094.

Michell, D. et al., "A Study of Ruthenium Electrodes by Cylic Voltammetry and X-ray Emission Spectroscopy", J. Electroanal. Chem., 1978, 89:11-27.

Bestaoui, N. et al., "A Chimie Douce Route to Pure Iridium Oxide", Chem. Matter., 1997, 9:1036-1041.

Heraeus Deutschland Gmbh & Co. KG, "In response to the Opposition filed by Johnson Matthey Hydrogen Technologies Limited", EP 19 185 574.1/3 764 443, 33 Pages.

Oakton, Emma et al. "A simple one-pot Adams method route to conductive high surface area $IrO_2$—$TiO_2$ materials." New J. Chem., 2016, 40, 1834-1838. https://doi.org/10.1039/C5NJ02400E.

* cited by examiner

CATALYST FOR OXYGEN GENERATION REACTION DURING WATER ELECTROLYSIS

This application is a national stage of International Application No. PCT/EP2020/065864 filed Jun. 8, 2020, which claims the benefit of Europe application Ser. No. 19/185,574.1 filed Jul. 10, 2019.

The present invention relates to the production of a catalyst composition which can be used as a catalyst in water electrolysis (in particular for the oxygen evolution reaction at the anode) or as a catalyst for a fuel cell (e.g. in combination with catalysts containing Pt or Pd that are supported on carbon).

Hydrogen is considered to be an energy carrier of the future since it enables sustainable energy storage, is available over the long term, and can also be produced using regenerative energy technologies.

Steam reforming is currently the most common method for producing hydrogen. In steam reforming, methane and water vapor are reacted to produce hydrogen and CO.

Water electrolysis represents a further variant of hydrogen production. Hydrogen of high purity can be obtained via water electrolysis.

There are various methods of water electrolysis, especially alkaline water electrolysis, acidic water electrolysis using a polymer electrolyte membrane ("PEM"; PEM water electrolysis) and high-temperature solid oxide electrolysis.

A water electrolysis cell contains a half-cell with an electrode at which the oxygen evolution reaction ("OER") takes place, as well as a further half-cell with an electrode at which the hydrogen evolution reaction ("HER") takes place. The electrode at which the oxygen evolution reaction takes place is referred to as the anode.

An overview of water electrolysis technology, in particular of PEM water electrolysis, can be found, for example, in M. Carmo et al., International Journal of Hydrogen Energy, 38, 2013, pp. 4901-4934; and V. Himabindu et al., Materials Science for Energy Technologies, 2, 2019, pp. 442-454.

In a polymer-electrolyte membrane water electrolysis cell (hereinafter also referred to as a PEM water electrolysis cell), the polymer membrane functions as a proton transport medium and electrically insulates the electrodes from each other.

The oxygen evolution reaction taking place at the anode of a PEM water electrolysis cell can be represented by the following reaction equation:

$$2H_2O \rightarrow 4H^+ + O_2 + 4e^-$$

Due to its complex reaction mechanism, the oxygen evolution reaction exhibits slow reaction kinetics, which is why significant overpotential at the anode is required in order to achieve sufficiently high conversion rates.

Efficient operation of a water electrolysis cell requires the presence of catalysts. In order to catalyze the oxygen evolution reaction at the anode of a PEM water electrolysis cell, iridium oxides, ruthenium oxides or Ir—Ru mixed oxides are used in particular. The catalytically active materials may optionally be present on a support material (e.g. in the form of nanoparticles or thin films) in order to thus increase the specific surface area of the catalyst material.

An overview of catalysts for the oxygen evolution reaction under acidic conditions (i.e., at the anode of a PEM water electrolysis cell) can be found, for example, in P. Strasser et al., Adv. Energy Mater., 7, 2017, 1601275; and F.M. Sapountzi et al., Progress in Energy and Combustion Science, 58, 2017, pp. 1-35. In the publication by F. M. Sapountzi et al., one of the requirements for electrocatalysts is that they should be as electrically conductive as possible so that electron transfer can take place efficiently.

There are a number of different methods by means of which iridium and/or ruthenium oxides can be produced, optionally in supported form on a support material.

One possible variant is wet chemical precipitation from an alkaline aqueous medium that contains an iridium-containing precursor compound. The precipitated iridium-containing solid is usually amorphous and has a relatively low electrical conductivity. By calcining the precipitated material at high temperature, crystalline $IrO_2$ is obtained which has a significantly higher electrical conductivity compared to amorphous iridium hydroxide oxide.

WO 2005/049199 A1 describes a method for producing a catalyst composition for water electrolysis. In this method, an iridium oxide is deposited on an oxidic support material in an aqueous medium containing an iridium precursor compound (for example, an Ir(III) or Ir(IV) compound). The method includes a thermal treatment at 300-800° C. The catalyst composition has a high proportion of iridium, which is disadvantageous from an economic point of view.

EP 2 608 297 A1 likewise describes a method for producing a supported iridium-containing catalyst composition for water electrolysis, in which iridium oxide is wet-chemically deposited on an oxidic support material under alkaline conditions. Again, the support material loaded with iridium oxide is subjected to a thermal treatment at 300-800° C.

EP 2 608 298 A1 describes an electrocatalyst for fuel cells which comprises the following components: (i) an oxidic support material as a core, (ii) an iridium oxide coating applied to the core, and (iii) a catalytically active noble metal such as platinum, which is present in the form of nanoparticles on the iridium oxide coating. It can be seen from the examples that the iridium oxide coating is subjected to a thermal treatment at 400° C.

For polymer-electrolyte membrane fuel cells ("PEM" fuel cells), carbon materials loaded with noble metal (e.g. a metallic platinum or a platinum alloy supported on a carbon material) are frequently used as catalyst compositions. Under certain conditions, so-called fuel starvation, a reversal of cell polarity can occur during operation of a PEM fuel cell. In normal operation, the hydrogen oxidation reaction (HOR) takes place on the anode side of the fuel cell:

$$2H_2 \rightarrow 4H^+ + 4e^-$$

After a reversal of cell polarity, the cell runs in electrolysis operation, wherein an oxygen evolution reaction takes place at the anode:

$$2H_2O \rightarrow 4H^+ + O_2 + 4e^-$$

Furthermore, carbon corrosion can occur according to the following equation:

$$C + 2H_2O \rightarrow CO_2 + 4H^+ 4e^-$$

Oxidation of the carbon can damage the support material significantly and irreversibly. However, if, in addition to the conventional fuel cell catalyst that catalyzes the hydrogen oxidation reaction, another catalyst is present that catalyzes the oxygen evolution reaction in the event of a reversal of cell polarity, water electrolysis will be preferred with regard to carbon corrosion and damage to the carbon-based support material will be reduced.

An object of the present invention is to provide a composition which has a high catalytic activity as regards the oxygen evolution reaction and is therefore suitable as a catalyst on the anode side of a water electrolysis cell or a fuel cell after a reversal of cell polarity.

The object is solved by a method for preparing a catalyst composition, wherein
- in an aqueous medium containing an iridium compound, an iridium-containing solid is deposited on a support material at a pH ≥9,
- the support material loaded with the iridium-containing solid is separated from the aqueous medium and dried, wherein the support material loaded with the iridium-containing solid is not subjected to any thermal treatment in the method at a temperature of more than 250° C. for a period of more than 1 hour.

The method according to the invention is a wet-chemical method that is simple to carry out. In an aqueous medium in which an iridium compound is dissolved, under alkaline conditions an iridium-containing solid is precipitated. In the presence of a support material, the iridium-containing solid deposits on this carrier. In the context of the present invention, it has been found that the support material loaded with the iridium-containing solid has a very high level of electrochemical activity if a longer thermal treatment at high temperature is avoided. In other words, if the loaded support material is dried at a moderate temperature and a subsequent calcination of the material at a high temperature is dispensed with, or at least the duration of the thermal treatment at a higher temperature is kept relatively short, this material will exhibit a high level of catalytic activity in the oxygen evolution reaction under acidic conditions and will therefore be outstandingly suited as a catalyst in the anodic side of a PEM water electrolysis cell or a PEM fuel cell.

Suitable support materials on which the iridium-containing solid can be wet-chemically deposited are known to the person skilled in the art. For example, the support material is an oxide of a transition metal (for example a titanium oxide (e.g., $TiO_2$), a zirconium oxide (e.g., $ZrO_2$), a niobium oxide (e.g., $Nb_2O_5$), a tantalum oxide (e.g., $Ta_2O_5$) or a cerium oxide), an oxide of a main group metal (e.g. a tin oxide such as $SnO_2$ or an aluminum oxide such as $Al_2O_3$), $SiO_2$ or a carbon material or a mixture of two or more of the aforementioned support materials.

The support material is usually a particulate support material.

The support material has, for example, a specific BET surface area of less than 100 $m^2/g$, preferably less than 60 $m^2/g$, more preferably less than 40 $m^2/g$. For example, the specific BET surface area of the support material is 5-100 $m^2/g$, more preferably 10-60 $m^2/g$ or 10-40 $m^2/g$.

Suitable support materials are commercially available or can be produced using conventional methods known to the person skilled in the art.

In the case of oxidic carriers, the oxide may be doped with suitable elements in order to improve its electrical conductivity. For example, the tin oxide may contain antimony ("ATO", "antimony-doped tin oxide").

If the support material is a carbon material, it may be preferred that this carbon material has a high degree of graphitization. This increases electrical conductivity and improves the corrosion resistance of the carbon material. An increase in the degree of graphitization of a carbon material is realized, for example, by a suitable thermal treatment. This is known to the person skilled in the art.

For example, the carbon material functioning as support material has a degree of graphitization of at least 60%, more preferably at least 63% (e.g., 60-90%, or 63-80%).

As described in EP 2 954 951 A1, the degree of graphitization g is determined using the following formula (1):

$$g = (344pm - d002)/(344pm - 335.4pm) \quad (1)$$

wherein d002 is the graphite basal plane spacing determined by X-ray diffraction from the diffraction line of the (002) plane of the graphitized carbon material.

The production of a carbon-based support material with a high degree of graphitization is described, for example, in EP 2 954 951 A1.

Suitable carbon-based support materials with a high degree of graphitization are also commercially available, for example under the name Porocarb® from Heraeus.

The support material is present in dispersed form in the aqueous medium.

The aqueous medium contains an iridium compound, which can be precipitated as an iridium-containing solid under alkaline conditions. Such iridium compounds are known to the person skilled in the art. It is preferably an iridium(IV) or an iridium(III) compound.

Suitable iridium(III) or iridium(IV) compounds, which precipitate as a solid under alkaline conditions in aqueous solution, are known to the person skilled in the art. For example, the iridium(III) or iridium(IV) compound is a salt (e.g., an iridium halide, such as $IrCl_3$ or $IrCl_4$; a salt whose anion is a chloro complex $IrCl_6^{2-}$; an iridium nitrate or an iridium acetate) or an iridium-containing acid, such as $H_2IrCl_6$. In a preferred embodiment, the aqueous medium contains an iridium(IV) halide, in particular Ir(IV) chloride.

Optionally, a ruthenium(III) and/or ruthenium(IV) compound may also be present in the aqueous medium. This enables the deposition of an iridium-ruthenium hydroxide oxide on the support material. If a ruthenium precursor compound is present in the aqueous medium, it can, for example, be a Ru(III) or Ru(IV) salt, for example a halide, nitrate or acetate salt.

For the deposition of the iridium-containing solid on the support material, the aqueous medium preferably has a pH value ≥10, more preferably ≥11. For example, the aqueous medium has a pH value of 9-14, more preferably 10-14, or 11-14.

The aqueous medium usually contains water in a proportion of at least 50 vol. %, more preferably at least 70 vol. % or even at least 90 vol. %.

For the deposition of the iridium-containing solid on the support material, the temperature of the aqueous medium is, for example, 40° C. to 100° C., more preferably 60° C. to 80° C.

Within the scope of the method according to the invention, the support material can, for example, be dispersed (for example at room temperature) in an aqueous medium already containing one or more iridium(III) and/or iridium (IV) compounds but having a pH of <9. The pH of the aqueous medium is then increased to a value of 9 by the addition of a base, and optionally also the temperature of the aqueous medium is increased until an iridium-containing solid is deposited on the support material via a precipitation reaction. Alternatively, it is possible, for example, to disperse the support material in an aqueous medium which as yet does not contain an iridium compound and to add an iridium(III) and/or iridium(IV) compound to the aqueous medium only after setting a suitable pH value and optionally a specific precipitation temperature.

The weight ratio of the support material to the total amount of iridium(III) and/or iridium(IV) compounds in the aqueous medium is selected, for example, such that the support material loaded with the iridium-containing solid contains iridium in a proportion of at most 50 wt. %, more preferably of at most 45 wt. %. For example, the loaded support material has an iridium content in the range of 10-50 wt. %, more preferably 15-45 wt. %.

Insofar as a ruthenium(III) and/or ruthenium(IV) compound was also present in the aqueous medium, the solid applied by the precipitation to the support material contains ruthenium in addition to iridium. The atomic ratio of iridium to ruthenium may, for example, be in the range from 90/10 to 10/90.

The separation of the support material loaded with the iridium-containing solid from the aqueous medium takes place by methods known to the person skilled in the art (e.g. by filtration).

The support material loaded with the iridium-containing solid is dried. The dried iridium-containing solid present on the support material is an iridium hydroxide oxide. In addition to oxide anions, an iridium hydroxide oxide also contains hydroxide anions and can be represented, for example, by the following formula: $IrO(OH)x$; $1 \leq x < 2$.

As stated above, in the method according to the invention, the support material loaded with the iridium-containing solid is not subjected to any thermal treatment at a temperature of more than 250° C. for a period of more than 1 hour.

The support material loaded with the iridium-containing solid is preferably not subjected to any thermal treatment in the method at a temperature of more than 200° C. for a period of more than 30 minutes.

For example, the support material loaded with the iridium-containing solid is dried at a temperature of at most 200° C. and is not subjected to any further thermal treatment after drying.

For example, the drying of the support material loaded with the iridium-containing solid is carried out at a temperature and over a period of time such that the iridium hydroxide oxide present on the support material after drying has an atomic ratio of iridium(IV) to iridium (III), determined by X-ray photoelectron spectroscopy (XPS), of at most 1.7/1.0, more preferably of at most 1.5/1.0. The loaded support material is dried, for example, at a temperature 250° C., more preferably ≤200° C., more preferably ≤150° C.

The term "iridium(IV)" denotes iridium atoms in the +4 oxidation state, while the term "iridium(III)" denotes iridium atoms in the +3 oxidation state.

The iridium hydroxide oxide obtained after drying has, for example, an atomic indium(IV)/iridium(III) ratio in the range from 1.0/1.0 to 1.7/1.0, more preferably from 1.2/1.0 to 1.5/1.0.

The iridium hydroxide oxide preferably does not contain any iridium(0). Iridium(0) denotes an iridium in the oxidation state 0. Preferably, no metallic iridium is thus present on the support material. The presence or absence of iridium(0) can be verified by XPS.

Optionally, the dried support material loaded with iridium hydroxide can be dispersed in a liquid medium so that a catalyst-containing ink is obtained.

Suitable liquid media that act as ink for supported catalysts and can be used for the production of catalyst-coated electrodes in an electrolysis cell (e.g., a PEM electrolysis cell for water electrolysis) or a PEM fuel cell are known to the person skilled in the art. For example, the ink contains an ionomer (e.g., a polymer that contains monomers containing sulfonic acid groups) and one or more short-chain alcohols (e.g., methanol, ethanol or n-propanol or a mixture of at least two of these alcohols).

The present invention further relates to a catalyst composition obtainable according to the method described above.

The catalyst composition thus contains a support material and an iridium hydroxide oxide present on the support material. With regard to suitable support materials and preferred properties of the iridium hydroxide oxide present on the support material, reference can be made to the above explanations.

As already mentioned above, it may be preferred for the iridium hydroxide oxide present on the support material to have an atomic ratio of iridium(IV) to iridium(III), as determined by X-ray photoelectron spectroscopy (XPS), of at most 1.7/1,0, more preferably of at most 1.5/1.0.

For example, the iridium hydroxide oxide has an atomic iridium(IV)/iridium(III) ratio in the range 1.0/1.0 to 1.7/1.0, more preferably 1.2/1.0 to 1.5/1.0. The iridium hydroxide oxide preferably does not contain any iridium(0). Iridium(0) denotes an iridium in the oxidation state 0. Preferably, no metallic iridium is thus present on the support material. The presence or absence of iridium(0) can be verified by XPS.

The iridium hydroxide oxide present on the support material is preferably amorphous, i.e., it shows no diffraction peaks in the X-ray diffractogram.

The catalyst composition has, for example, a specific BET surface area of less than 100 $m^2/g$, preferably less than 60 $m^2/g$, more preferably less than 40 $m^2/g$. For example, the specific BET surface area of the catalyst composition is 5-100 $m^2/g$, more preferably 10-60 $m^2/g$, or 10-40 $m^2/g$.

The catalyst composition preferably contains no further precious metal apart from iridium and optionally ruthenium.

The present invention further relates to an electrolysis cell, in particular a PEM electrolysis cell for water electrolysis, containing the catalyst composition according to the invention described above.

The required components for the structure of a PEM electrolysis cell are known to the person skilled in the art. The polymer electrolyte membrane ("PEM") contains, for example, a polymer which has monomers containing sulfonic acid groups.

The catalyst composition is preferably present in the half-cell in which oxygen is generated (i.e. on the anodic side of the electrolysis cell).

The present invention further relates to a fuel cell, in particular a PEM fuel cell, containing the catalyst composition according to the invention described above.

The required components for the construction of a PEM fuel cell are known to the person skilled in the art. The polymer electrolyte membrane ("PEM") contains, for example, a polymer which has monomers containing sulfonic acid groups.

The catalyst composition is preferably present on the anodic side of the fuel cell, for example together with a conventional catalyst composition comprising a carbon material as a support material and, applied to this support material, a noble metal, in particular platinum or palladium, in the form of an elemental metal or a metal alloy.

The present invention further relates to the use of the catalyst composition according to the invention described above as a catalyst for the oxygen evolution reaction in water electrolysis.

Measuring Methods

The following measuring methods were used within the context of the present invention:

Specific BET Surface Area

The BET surface area was determined with nitrogen as adsorbate at 77 K in accordance with BET theory (multipoint method, ISO 9277:2010).

Atomic Ratio of Ir(IV) to Ir(III)

The relative proportions of the Ir atoms of oxidation state +4 and of oxidation state +3, and thus the atomic Ir(IV)/Ir (III) ratio in the supported iridium hydroxide oxide, were determined by X-ray photoelectron spectroscopy (XPS). Determination of this ratio is carried out in a detailed spectrum of the Ir(4f) doublet (BE 75-55 eV, Al-kα source) by an asymmetric peak fit—Shirley background, Gaus-Lorentz mixture with 30% Gaussian content and a tailoring factor of 0.7. In addition, the presence of an IrOH species in the O(1s) detail spectrum (BE approx. 531 eV, Al-kα source) is also detected by means of an asymmetric peak fit (Shirley background, Gaus-Lorentz mixture with 30% Gaus content). A corresponding procedure is described, e.g., in Abbott et al., Chem. Mater., 2016, 6591-6604.

XPS analysis can also be used to check whether iridium (0) is present in the composition.

Iridium Content of the Support Material Loaded with Iridium Hydroxide Oxide

The iridium content and, if present, the content of ruthenium are determined by optical emission spectrometry with inductively coupled plasma (ICP-OES).

The present invention is explained in further detail with reference to the examples described below.

EXAMPLES

Example 1 According to the Invention (EB1) and Comparative Examples 1-3 (VB1-VB3)

In EB1 and VB1-VB3, the same support material was used, namely a $TiO_2$ having a specific BET surface area of 60 $m^2/g$.

Furthermore, in EB1 and VB1-VB3, a wet-chemical deposition of an iridium-containing solid precipitated at alkaline pH value onto the $TiO_2$ support material took place in the same way. This wet-chemical deposition was carried out as follows:

124.56 g of iridium(IV) chloride ($IrCl_4$ hydrate, Heraeus Deutschland GmbH & Co. KG) was dissolved in 4000 mL of water at room temperature. Next, 60.17 g $TiO_2$ (P25, Evonik, BET surface area: 60 m2/g) was added. The pH was adjusted to 9.7 by addition of NaOH. The aqueous medium was heated to 70° C. and the pH was adjusted to 11. It was stirred overnight at 70° C. The pH was maintained at 11. The $TiO_2$ support material loaded with the iridium-containing solid was filtered off and washed.

After separation of the support material loaded with the iridium-containing solid from the aqueous deposition medium, different thermal treatments took place in EB1 and VB1-VB3:

The loaded support materials of examples EB1 and VB1-VB3 each had an iridium content of about 45 wt %.

EB1: The loaded support material was dried overnight at 120° C. The XPS analysis showed that the dried iridium-containing solid present on the carrier is an iridium hydroxide oxide.

VB1: The loaded support material was heated at 300° C. for 4 hours.

VB2: The loaded support material was heated at 360° C. for 4 hours.

VB3: The loaded support material was heated at 400° C. for 4 hours.

For the catalyst compositions obtained in EB1 and VB1-VB3, the electrochemical activity (in mA per mg of iridium) was determined with regard to the oxygen evolution reaction during water electrolysis.

The activity was determined in electrochemical measurements of the rotating disk electrode.

This electrochemical characterization took place in a three-electrode set-up with a graphite rod as counter-electrode, a saturated calomel electrode as reference electrode (all potentials were converted to the RHE) and the catalyst materials in examples EB1 and VB1-VB3, which were each present as a thin film on a glassy carbon substrate as working electrode (loading level: 100 μg/cm2). The measurements took place at 60° in 0.5 M H2SO4 in air at a rotational speed of 1600 rpm. Taking hysteresis into account, the activity values were determined from anodic and cathodic potential run at 1.5 $V_{RHE}$.

Table 1 shows the results of these measurements.

TABLE 1

| | Electrochemical activity | |
|---|---|---|
| | Thermal treatment of the loaded support material | Electrochemical activity [mA/g Ir] |
| Inventive Example EB1 | 120° C. | 660 |
| Comparative Example VB1 | 300° C. | 470 |
| Comparative Example VB2 | 360° C. | 420 |
| Comparative Example VB3 | 400° C. | 310 |

The results show that the support material loaded with the iridium-containing solid has a very high level of electrochemical activity when thermal treatment at high temperature is avoided. Thus, if the loaded support material is dried at a moderate temperature and subsequent calcination of the material at a high temperature is dispensed with, this material will exhibit a high level of catalytic activity in the oxygen evolution reaction under acidic conditions and will therefore be very well suited as a catalyst in the anodic side of a PEM water electrolysis cell or a PEM fuel cell.

Inventive Example 2 (EB2)

In EB2, a porous carbon material (Porocarb®, Heraeus) was used as support material instead of $TiO_2$. The ratios between the iridium starting compound and the support material were selected so as to result in a loaded support material having an iridium content of approximately 30 wt. %. Apart from that, the iridium-containing solid was deposited on the support material under the same conditions as in EB1.

After separation from the aqueous deposition medium, the loaded support material was dried at 120° C. There was subsequent thermal treatment at higher temperatures. XPS analysis shows that the dried iridium-containing solid present on the carrier is an iridium hydroxide oxide.

The carbon material, loaded with iridium hydroxide oxide, and dried at 120° C. was subjected to the electrochemical activity measurement described above. An activity of 625 mA/g iridium was measured. Thus, even when using a carbon-based support material instead of an oxidic support material, a very high level of electrochemical activity with regard to the oxygen evolution reaction is exhibited if a thermal aftertreatment at high temperature is dispensed with.

The invention claimed is:

1. A method for preparing a catalyst composition, the method comprising:
    using an aqueous medium containing an iridium compound, depositing an iridium-containing solid on a support material at a pH≥9, wherein the support material is a titanium oxide, a zirconium oxide, a niobium oxide, a tantalum oxide, a cerium oxide, or $SiO_2$;
    separating the support material loaded with the iridium-containing solid from the aqueous medium; and
    drying the support material loaded with the iridium-containing solid,
    wherein, the support material loaded with the iridium-containing solid is dried at a temperature of at most 200° C. and is not subjected to any further thermal treatment after drying, and
    wherein the iridium-containing solid obtained after drying is an iridium hydroxide oxide.

2. The method of claim 1, wherein the support material has a specific BET surface area of less than 100 m²/g.

3. The method of claim 1, wherein the iridium compound present in the aqueous medium is an iridium (IV) compound or an iridium (III) compound.

4. The method of claim 3, wherein the iridium (IV) or iridium (III) compound is a salt.

5. The method of claim 4, wherein the salt is an iridium halide, a salt whose anion is a chloro complex $IrCl_6^{2-}$, an iridium nitrate, an iridium acetate, or an acid containing iridium.

6. The method of claim 1, wherein the aqueous medium for the deposition of the iridium-containing solid on the support material has a pH ≥10, and the temperature of the aqueous medium for the deposition of the iridium-containing solid on the support material is from 40° C. to 100° C.

7. The method of claim 1, wherein the iridium hydroxide oxide-loaded support material contains iridium in a proportion of at most 50 wt. %; and
    the iridium hydroxide oxide present on the support material after drying has an atomic ratio of iridium (IV) to iridium (III), as determined by X-ray photoelectron spectroscopy (XPS), of at most 1.7/1.0.

8. The method of claim 1, wherein, after drying, the support material loaded with the iridium-containing solid is dispersed in a liquid medium to obtain a catalyst-containing ink.

9. The method of claim 1, wherein the iridium hydroxide oxide present on the support material after drying has an atomic ratio of iridium (IV) to iridium (III), as determined by X-ray photoelectron spectroscopy (XPS), of at most 1.7/1.0.

10. The method of claim 1, wherein the temperature of the aqueous medium for the deposition of the iridium-containing solid on the support material is from 40° C. to 100° C.

11. The method of claim 1, wherein the iridium hydroxide oxide present on the support material after drying has an atomic ratio of iridium (IV) to iridium (III), as determined by X-ray photoelectron spectroscopy (XPS), ranging from 1.0/1.0 to 1.7/1.0.

12. The method of claim 1, wherein the iridium hydroxide oxide present on the support material after drying has an atomic ratio of iridium (IV) to iridium (III), as determined by X-ray photoelectron spectroscopy (XPS), ranging from 1.2/1.0 to 1.5/1.0.

13. The method of claim 1, wherein the aqueous medium further comprises a ruthenium (II compound or a ruthenium (IV) compound.

* * * * *

UNITED STATES PATENT AND TRADEMARK OFFICE
CERTIFICATE OF CORRECTION

PATENT NO. : 12,247,301 B2
APPLICATION NO. : 17/625621
DATED : March 11, 2025
INVENTOR(S) : Martina Kemmer It is certified that error appears in the above-identified patent and that said Letters Patent is hereby corrected as shown below:

In the Claims

Column 10, Line 32, Claim 13, change "ruthenium (II" to -- ruthenium (III) --.

Signed and Sealed this
Twenty-ninth Day of April, 2025

Coke Morgan Stewart
*Acting Director of the United States Patent and Trademark Office*